United States Patent [19]

Handler

[11] Patent Number: 4,879,854

[45] Date of Patent: Nov. 14, 1989

[54] HOOK AND LOOP PARTITIONING SYSTEM

[75] Inventor: Michael D. Handler, Norwalk, Conn.

[73] Assignee: Velcro Industries B.V., Amsterdam, Netherlands

[21] Appl. No.: 161,337

[22] Filed: Feb. 19, 1988

Related U.S. Application Data

[63] Continuation of Ser. No. 893,382, Aug. 5, 1986, abandoned.

[51] Int. Cl.$^4$ ............................................... E04B 2/82
[52] U.S. Cl. ...................................... 52/238.1; 52/71; 52/DIG. 13; 24/442; 160/135
[58] Field of Search .................... 52/DIG. 13; 24/306, 24/442, 443, 444, 445, 446, 447, 448; 160/135, 351

[56] References Cited

U.S. PATENT DOCUMENTS

| | | | |
|---|---|---|---|
| 1,638,073 | 8/1927 | Van Heusen | 24/204 |
| 2,728,480 | 12/1955 | Close | 312/263 |
| 3,176,364 | 4/1965 | Dritz | 24/204 |
| 3,192,306 | 6/1965 | Skonnord | 312/213 |
| 3,251,399 | 5/1966 | Grossman | 160/180 |
| 3,413,656 | 12/1968 | Vogliano et al. | 2/2 |
| 3,460,860 | 8/1969 | Stevens | 52/71 |
| 3,475,810 | 11/1969 | Mates | 24/204 |
| 3,491,486 | 1/1970 | Caruth | 49/463 |
| 3,512,318 | 5/1970 | Turner | 52/100 |
| 3,566,556 | 3/1971 | Nichols | 52/71 |
| 3,662,807 | 5/1972 | Miller | 160/135 |
| 3,668,808 | 6/1972 | Perina | 49/465 |
| 3,721,050 | 3/1973 | Perina | 52/DIG. 13 |
| 3,745,709 | 7/1973 | Perina | 49/465 |
| 3,777,435 | 12/1973 | Perina | 52/DIG. 13 |
| 3,780,479 | 12/1973 | Billarant | 52/DIG. 13 |
| 4,028,855 | 6/1977 | Prewer | 52/DIG. 13 |
| 4,047,337 | 9/1977 | Bergstrom | 52/71 |
| 4,098,402 | 7/1978 | Rogg . | |
| 4,163,303 | 8/1979 | Hanna | 24/442 |
| 4,165,555 | 8/1979 | Boxer et al. | 24/204 |
| 4,271,566 | 1/1981 | Perina | 24/204 |
| 4,352,524 | 10/1982 | Crosby | 24/442 |
| 4,493,174 | 1/1985 | Arens | 52/243 |
| 4,534,471 | 8/1985 | Zahn et al. | 211/39 |
| 4,635,418 | 1/1987 | Hobgood | 52/DIG. 13 |

FOREIGN PATENT DOCUMENTS

| | | |
|---|---|---|
| 2612773 | 10/1976 | Fed. Rep. of Germany . |
| 8626321 | 1/1987 | Fed. Rep. of Germany . |
| 2167922 | 6/1973 | France . |
| 277237 | 11/1951 | Switzerland ........................ 160/135 |

Primary Examiner—John E. Murtagh
Attorney, Agent, or Firm—Hayes, Soloway, Hennessey & Hage

[57] ABSTRACT

An improved fastening system for use with partitioning systems of the type wherein repositionable walls are fastened together to define office spaces, and the like. Hook and loop fastening materials are employed "in shear" to provide a strong holding force but are contained within a shear trap channel to provide for ease of release when required. In its basic form, the fastening system comprises a first U-shaped member adapted to fit over and attach to an edge of a wall partition to be joined to another partitioning component and having parallel outer faces each having one of the portions of the fastening system thereon; and, a second U-shaped member adapted to be carried by the other partitioning component and having parallel inner faces on the sides of the U each having the other of the portions of the fastening system thereon. The second U-shaped member is adapted to receive the first U-shaped member and its wall partition between the inner faces with the portions of the loop fastening portions in engagement. The second U-shaped member is also adapted to have the sides pivoted adjacent the closest end of the U to allow progressive disengagement of the portions of the fastening system.

10 Claims, 2 Drawing Sheets

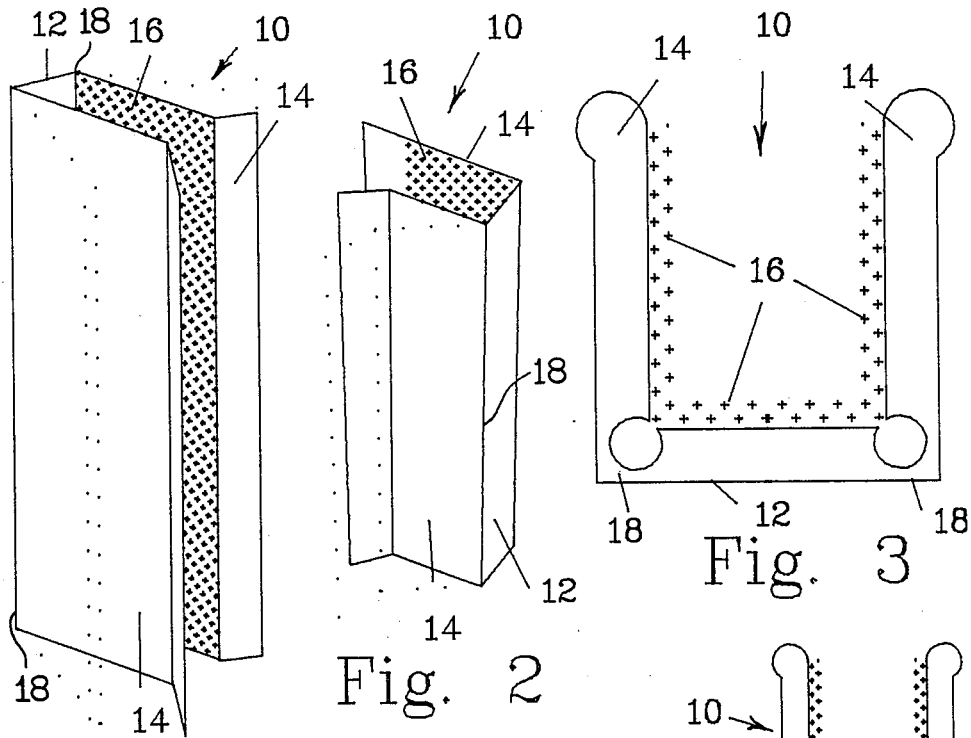
Fig. 1
Fig. 2
Fig. 3
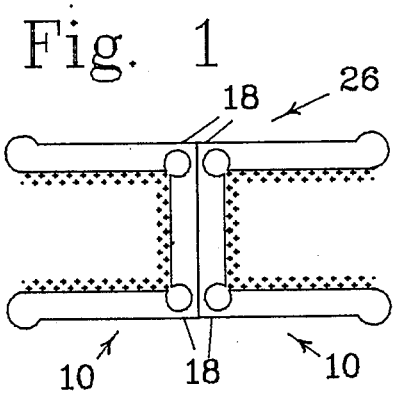
Fig. 4
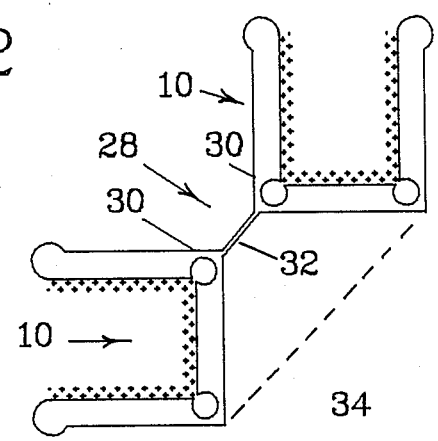
Fig. 5

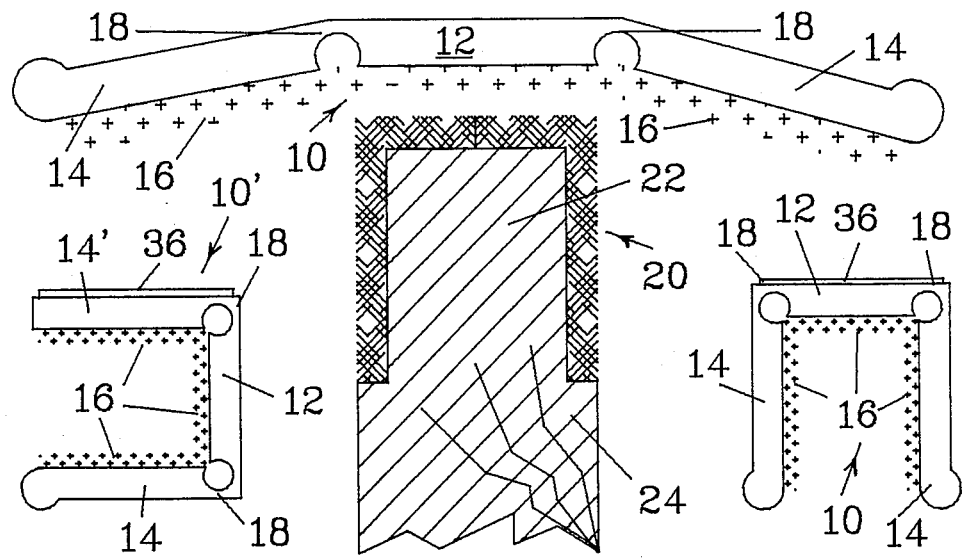
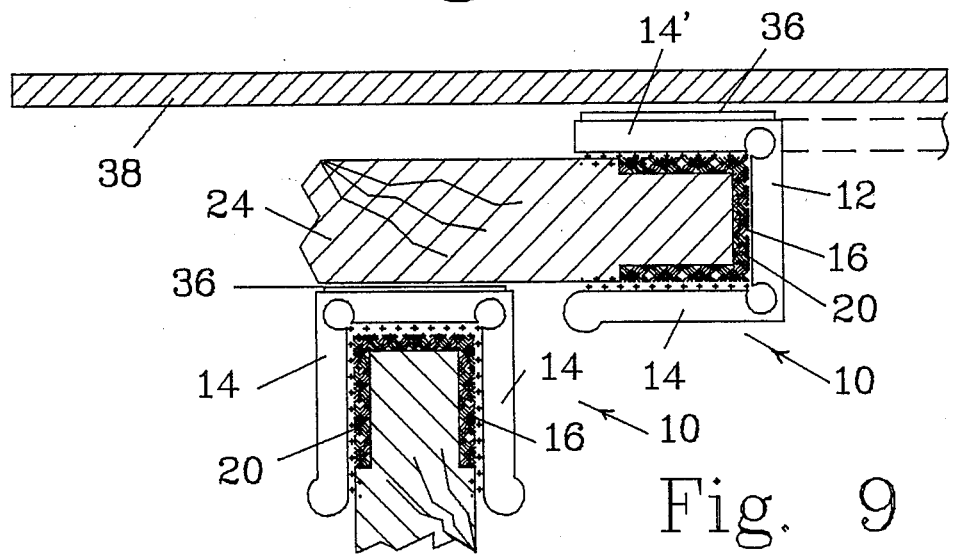

HOOK AND LOOP PARTITIONING SYSTEM

This is a continuation of co-pending application Ser. No. 893,382 filed on Aug. 5, 1986 now abandoned.

BACKGROUND OF THE INVENTION

The present invention relates to partitioning systems for offices and the like wherein preformed planar wall partitions are releasably attached to one another and other partitioning components and, more particularly to an improved fastening system of the hook and loop type for releasably fastening partitioning componets together in shear characterized by a first U-shaped member adapted to fit over and attach to an edge of a wall partition to be joined to another partitioning component and having parallel outer faces each having one of the portions of the fastening system thereon; and, a second U-shaped member adapted to be carried by the other partitioning component and having parallel inner faces on the sides of the U each having the other of the portions of the fastening system thereon, the second U-shaped member being adapted to receive the first U-shaped member and its wall partition between the inner faces with the portions of the loop fastening portions in engagement; and being further adapted to have the sides pivoted adjacent the closed end of the U to allow progressive disengagement of the portions of the fastening system.

Repositionable wall systems are quite popular in modern offices. Often referred to as "modular" systems, they allow an enlarged area containing no inner supporting walls to be dynamically divided into office spaces, and the like on an as-needed basis. That is, spaces can be defined for any term of time that meets the requirements of the business using them and can then be disassembled and reconfigured to meet new need.

Using modern materials, the wall panels the comprise the basic component or "building blocks" of these systems can be made to be of light weight and of good sound deadening characteristics. The problem area is that of fastening the panels to one another and to the other components of the system such as outside walls and furniture, such as desks, being used for support and anchor points. Where there is a metal or wooden supporting framework on each panel, it has been common practice to employ cam locking mechanisms within the framework. Pins can be inserted into matching adjoining locking mechanisms in adjacent panels and the locking mechanisms cam locked to the pins to lock the panels together. While such prior art fastening systems work, they are complex, expensive, and impractical for attaching to the desks and outside walls. Where it is desired to employ lightweight, unitary panels having no outside framework to house the locking mechanisms, such fastening systems become completely impossible to employ.

Wherefore, it is the object of the present invention to provide a fastening system which can be used with unframed, unitary wall panels, and the like, which is strong in its gripping force but easy to disassemble to provide for ease of reconfiguration of office spaces, and the like, defined by wall panels employing such a system.

SUMMARY

The foregoing object has been achieved in a partitioning system for offices and the like wherein preformed planar wall partitions are releasably attached to one another and other partitioning components by the improved fastening system of the present invention which is of the hook and loop type for releasably fastening partitioning components together in shear and which is characterized by a first U-shaped member adapted to fit over and attach to an edge of a wall partition to be joined to another partitioning component and having parallel outer faces each having one of the portions of the fastening system thereon; and, a second U-shaped member adapted to be carried by the other partitioning component and having parallel inner faces on the sides of the U each having the other of the portions of the fastening system thereon. The second U-shaped member is adapted to receive the first U-shaped member and its wall partition between the inner faces with the portions of the loop fastening portions in engagement; and, is further adapted to have the sides pivoted adjacent the closed end of the U to allow progressive disengagement of the portions of the fastening system.

In the preferred embodiment, the second U-shaped member comprises a pair of U-shaped members each adapted to receive a first U-shaped member therein and each includes the parallel inner faces each having the other of the portions of the fastening system thereon whereby two wall panels having the first U-shaped members on facing edges thereof can be joined thereby. For fastening two panels together in a common plane, the two U-shaped members are disposed back to back. The two U-shaped members are disposed at right angles for joining two wall panels at a corner.

In the preferred embodiment, the second U-shaped member is a resiliently rigid channel having a back portion and two parallel facing side portions wherein the side portions are hingedly attached to the back portion. To provide a means of fastening panels to walls, desks and the like, at a perpendicular orientation thereto, the second U-shaped member has adhesive on the outer surface of the back portion for adhesvely attaching the second U-shaped member to a surface. For attaching a panel at a parallel orientation to a surface, the adhesive is provided on the outside of one of the side portions whereby the second U-shaped member can be hingedly unfolded flat against the surface to receive the first U-shaped member therein.

DESCRIPTION OF THE DRAWINGS

FIG. 1 is a simplified perspective view of one embodiment of Applicant's invention of a shear trap channel as employed in the present invention.

FIG. 2 is a simplified perspective view of a second embodiment of Applicant's invention of a shear trap channel as employed in the present invention.

FIG. 3 is an end view of the basic shear trap channel structure as employed in the fastening system of the present invention.

FIG. 4 is an end view of a shear trap channel fastener according to the present invention as used for connecting two wall panels, or the like, in a common plane.

FIG. 5 is an end view of a shear trap channel fastener according to the present invention as used for angularly connecting two wall panels, or the like, to one another.

FIG. 6 is a top view of the fastening system of the present invention in its opened position for receiving (or releasing) a wall panel, or the like.

FIG. 7 is an end view of a shear trap channel fastener according to the present invention as used for connecting a wall panel, or the like, to a surface in parallel orientation thereto.

FIG. 8 is an end view of a shear trap channel fastener according to the present invention as used for connecting a wall panel, or the like, to a surface in perpendicular orientation thereto.

FIG. 9 is a cutaway top view through a panel and wall segment showing the use of the fasteners of the present invention.

DESCRIPTION OF THE PREFERRED EMBODIMENT

In my co-pending patent application (U.S. patent application Ser. No. 893,390 now abandoned) entitled SHEAR TRAP HOOK AND LOOP FASTENING SYSTEM, filed on Aug. 5, 1986 and assigned to the common assignee of this application, I described an improvement to hook and loop fastening systems wherein a shear trap channel is employed to use the hook and loop fastening material "in shear" to provide a high holding strength. The shear trap channel, however allows the hook and loop fastening materials to be disengaged easily when necessary. The teachings of that co-pending application are hereby incorporated herein by reference and, accordingly, only a cursory description of the basic invention as incorporated into this invention will be provided.

Turning briefly to FIGS. 1 and 2, the shear trap channels of my above-referenced co-pending application are shown in simplified form. In both cases, the trap channel is indicated as 10 and comprises a back portion 12 from which two parallel, spaced side portions 14 extend. In the preferred embodiment, the trap channels 10 are made of resiliently rigid plastic and the hinges 18 described with relation thereto are so-called "living hinges" formed into the plastic material. In the embodiment of FIG. 1, both side portions 14 are hingedly attached to the back portion 12 such that both can swing outward, as indicated by the dotted ghost lines, for release of the hook and loop fastening materials employed therewith. Attachment of something to be fastened therewith is made to the back portion. In the embodiment of FIG. 2, only one side portion 14 is hingedly attached to the back, as indicated by the single dotted ghost line. Attachment to this embodiment is made to either the back portion 12 or the other side portion 14. In the preferred embodiment, the facing inner surfaces of the side portions 14 have the hook portion 16 of hook and loop type fastening material thereon. Thus, if a planar member (not shown) having the loop material on outward facing parallel surfaces is inserted between the side portions 14, the planar member will be maintained therein with the hook and loop material operating "in shear". By swinging the side portions 14 outward, however, the hook and loop materials can be progressively released to allow the planar member to be withdrawn.

Turning now to FIG. 3, the basic structure for a shear trap channel of the fastening system of the present invention is shown in an end view. As will be appreciated by those skilled in the art, the fastening members can be of any length which is convenient for the particular application. As with the above-described shear trap channel 10 of my co-pending application, the basic shear trap channel 10 of this invention is of tough, resilient plastic and comprises a back portion 12 from which parallel, spaced side portions 14 extend. At the points where the side portions 14 join the back portion 12, there are longitudinal living hinges 18. While the fastening material could be employed on only the side portions 14, in this particular invention it is preferred that the fastening material be used on the inner surfaces of the side and back portions 14, 12. As described in the above-reference co-pending application, either the hook or loop portion can be used in the trap channel; but it is preferred to use the hook material 16 therein as indicated in FIG. 3.

The use and operation of the shear trap channel fastening system with relation to wall panels, and the like, is depicted in FIG. 6. As indicated therein, because of the living hinges 18, the side portions 14 can be pivoted outward to the position of FIG. 6. A U-shaped piece of the loop portion of the hook and loop fastening material such as that sold by the assignee of the present invention under the trademark Velcro, generally indicated as 20, is disposed over the edge 22 of the panel 24. The U-shaped piece of loop material 20 can, and in most cases will, comprise an adhesive-backed strip of the loop material which is fit around the edge 22 into the U-shaped as shown. A pre-formed U-shaped member could, of course, be employed and attached adhesively or otherwise, to the edge 22 is desired. The edge 22 is pressed into the hook portion 16 on the back portion 12 and then the side portions 14 are swung about the living hinges 18 to engage the hook and loop portions 16, 20 thereon. To release the panel 24 from the trap channel 10, the process is simply reversed.

Several configurations for the trap channels, singly or in combination, are shown in FIGS. 4, 5, 7 and 8. In FIG. 4, a trap channel fastener 26 is shown for fastening two planar wall panels, or the like together in a common plane such as in the construction of a common wall. The fastener 26 comprises two shear trap channels 10 of the type shown in FIG. 3 in back to back relationship. This could be accomplished by a common extrusion or by adhesively fastening two channels 10 together such as with adhesive strip. A second fastener 28 is shown in FIG. 5 which is of a type which would be used for fastening two planar panels together at an angle to one another. In this case, the two trap channels 10 are joined together at their respective corners 30 by a thin strip 32 acting as a living hinge to provide adjustability of the angle. If desired, a longtudinal triangular strip 34 can be fastened to the back portions 12 as by adhesive strips (not shown) for decorative purposes and to hold a firm pre-established angle (such as 90°0 as shown. Optionally, of course, the living hinge 32 could be omitted and the two trap channels 10 and the triangular strip 34 extruded in a unitary construction. It should also be noted and appreciated by those skilled in the art, however, that if the two trap channels 10 are made with the living hinge 32 as shown in FIG. 5, the back to back configuration of FIG. 4 can also be achieved by simply attaching a strip of adhesive material to one of the back portions 12 and folding the other back portion into adhesive engagement therewith. Thus, only one extrusion would be required for all panel to panel connectors.

The embodiments of FIG. 7 and 8 are employed for fastening a planar panel to a surface such as an outside wall or a desk. The trap channel 10' of FIG. 7 is used for parallel attachment while the trap channel 10 of FIG. 8 is used for perpendicular attachment. This is shown in FIG. 9. In each case, a strip 36 of peel and stick adhesive (many of which are well known in the art) is used for fastening to the surface. The trap channel 10' of FIG. 7 has a planar side portion 14' adapted to fit flat against the side of the desk 38. As previously described, the trap channel 10' because of the two living hinges 18, can be swung outward flat against the desk side 38 as indicated by the dotted lines. This permits the first panel 24 which is parallel to the desk side 38 to be so positioned. The side and back portions 14, 12 are then swung into their locked or fastened positions as shown in FIG. 9. The perpendicular attachment trap channel 10 is then adhesively fastened to the first panel 24 and the second panel 24 secured therein in the manner previously described.

Thus, it can be seen that by employing the fastening system of the present invention, modular wall and partitioning systems can be constructed which are simple, lightweight, secure, and easy to use and reconfigure.

It will be appreciated that the cross-section of the channel of FIGS. 1 and 2 may be varied without departing from the inventive concept, for example, the sides might converge to engage a triangular member or might be curved to engage a circular or otherwise curved member.

It will also be appreciated that the channel members would be part of the panels 24 to engage supports carrying portions corresponding to edges 22.

A touch fastener, as used in this application, comprises a first planar backing material having a surface carrying hooks, mushrooms, balls on stems, pigtails, or the like, capable of engaging loops, hooks, mushrooms, balls on steams, pigtails, or the like, carried by a second planar backing material to releasably fasten components together. Terms herein referring to hook and loop fastening systems and parts thereof shall be construed to include other types of touch fasteners in which the fastening strength in shear (i.e. against forces applied in the plane of the fastener) substantially exceeds the fastening strength resisting peeling separation of the fastener by the application of force normal to the plane thereof.

Wherefore, having thus described my invention, I claim:

1. A partitioning system for offices and the like for releasably attaching partitioning components, the improvement comprising at least one preformed planar wall partition, a structure to which said wall partition is to be attached, and a touch fastening system having interconnectable first and second portions, said first portion carrying a plurality of projecting elements capable of releasably engaging cooperating projecting elements carried by said second portion, for releasably fastening said partitioning components together, said touch fastening system comprising:
    (a) said preformed planar wall partition having parallel outer faces, at at least one end thereof, said outer faces carrying said first portion of the touch fastening system thereon; and,
    (b) at least one U-shaped channel member, carried by said structure, having a resiliently rigid back portion interconnecting a pair of resiliently rigid opposed side portions defining inner faces, each inner face having said second portion of the touch fastening system thereon, said back portion of said U-shaped channel member being of a width so that when said U-shaped channel member receives said parallel outer faces of said end between said inner faces, with the first and second portions of the touch fastening system engaged, said inner and outer faces are substantially parallel to one another and the touch fastening system acts in shear to attach said components together, said U-shaped channel member having at least one of said side portions pivotable adjacent the closed end of the U to allow progressive disengagement of the touch fastening system when desired.

2. The improvement of claim 1 wherein:
said touch fastening system comprises a pair of U-shaped channel members each adapted to receive one of said partitions having said first portion of the fastening system thereon, said pair of U-shaped channel members being fastened to each other, whereby two partitioning components can be joined together upon engagement with said pair of U-shaped channel members.

3. The improvement of claim 2 wherein:
said two U-shaped channel members are disposed back to back for joining two of said wall partitions in a common plane.

4. The improvement of claim 2 wherein:
said two U-shaped channel members are disposed at right angles for joining two of said wall partitions at a corner.

5. The improvement of claim 4 wherein:
said two U-shaped channel members are joined at a point connecting one of each of their corners with hinges.

6. The improvement of claim 5 wherein:
said two U-shaped channel members are a unitary extrusion of tough resilient plastic having a living hinge at said point of joining and are adapted to swing on said living hinge into a back to back relationship.

7. The improvement of claim 4 and additionally comprising:
a triangular member adapted for attachment to said two U-shaped channel members for holding them in an angular relationship to one another.

8. The improvement of claim 1 wherein:
said U-shaped channel member has adhesive on one outer surface thereof for adhesively attaching said U-shaped channel member to a surface.

9. The improvement of claim 8 wherein:
said adhesive is on the outside of one of said side portions whereby said U-shaped channel member can be hingedly unfolded flat against the surface to receive said partition therein.

10. The improvement of claim 1, wherein said structure to which said wall partition is to be attached comprises another preformed planar wall partition.

* * * * *